US008407304B2

(12) United States Patent
Reddy et al.

(10) Patent No.: US 8,407,304 B2
(45) Date of Patent: *Mar. 26, 2013

(54) METHOD AND SYSTEM FOR EMAIL NOTIFICATION

(75) Inventors: Raymond Reddy, Kitchener (CA); Suryanarayana Murthy Gorty, Redmond, WA (US)

(73) Assignee: Research In Motion Limited, Waterloo (CA)

( * ) Notice: Subject to any disclaimer, the term of this patent is extended or adjusted under 35 U.S.C. 154(b) by 41 days.

This patent is subject to a terminal disclaimer.

(21) Appl. No.: 13/211,632

(22) Filed: Aug. 17, 2011

(65) Prior Publication Data

US 2011/0302260 A1 Dec. 8, 2011

Related U.S. Application Data

(63) Continuation of application No. 11/615,091, filed on Dec. 22, 2006, now Pat. No. 8,028,027.

(51) Int. Cl.
*G06F 15/16* (2006.01)
(52) U.S. Cl. .................................................. 709/206
(58) Field of Classification Search ............... 709/206; 379/93.01–93.08
See application file for complete search history.

(56) References Cited

U.S. PATENT DOCUMENTS

2003/0154254 A1* 8/2003 Awasthi ........................ 709/206
2004/0019649 A1* 1/2004 Tanimoto ..................... 709/206

FOREIGN PATENT DOCUMENTS

WO 9922576 5/1999
WO 0011585 3/2000

OTHER PUBLICATIONS

Klensin, "Simple Mail Transfer Protocol, draft-ietf-drums-smtpupd-13.txt", Sep. 26, 2000, retrieved from http://tools.ietf.org/html/draft-ietf-drums-smtpupd-13 on Jun. 20, 2009.*
Notice of Allowance and Fee(s) Due dated May 17, 2011. In corresponding U.S. Appl. No. 11/615,091.
Klensin, J. Request for comments (RFC): Simple Mail Transfer Protocol, Network Working Group Memos, AT&T Laboratories, Apr. 2001, pp. 1-79.
G-lock Software, Reference Guide : G-Lock Email Processor, Internet Citation, Oct. 2, 2003. Retrieved from the Internet ://URL:http://web.archive.org/web/20031002053551/http://mirror1.glocksoft.com/EmailProcessorManual.pdf (retrieved on May 29, 2007.

* cited by examiner

*Primary Examiner* — Liangche A Wang
(74) *Attorney, Agent, or Firm* — Novak Druce Connolly Bove + Quigg LLP

(57) ABSTRACT

A method of configuring a system for providing notification of a new email received at a user's mailbox stored by a first mail storage system for retrieval by a second mail storage system. The method comprises configuring a mail sender to send a notification email to the second mail storage system comprising data to notify the second mail storage system of the new email, receive a rejection message from the second mail storage system, and interrupt the sending of further data of the notification email in response to the rejection message, wherein the receipt by the second mail storage system of the notification email triggers the second mail storage system to retrieve the new email from the first mail storage system.

27 Claims, 9 Drawing Sheets

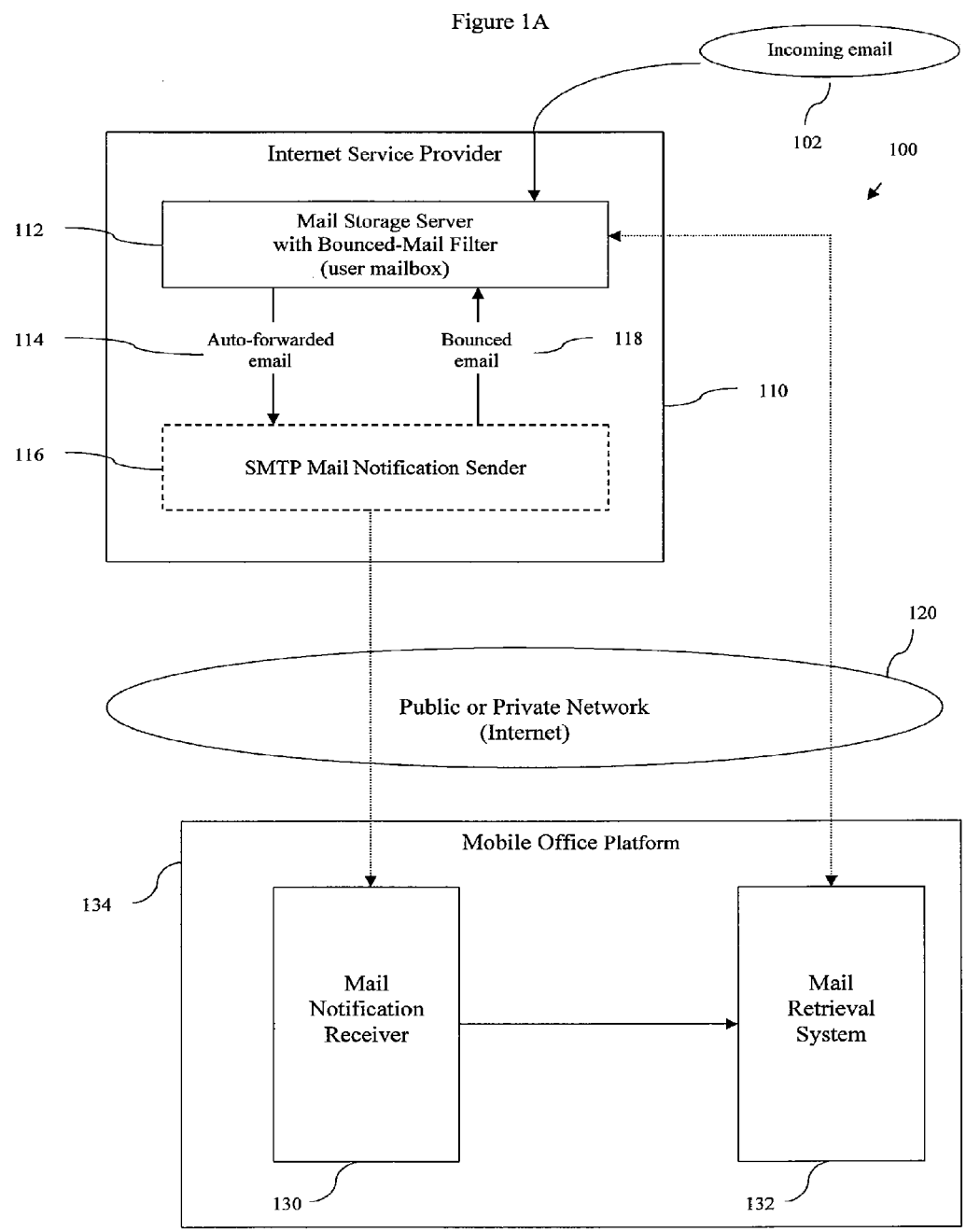

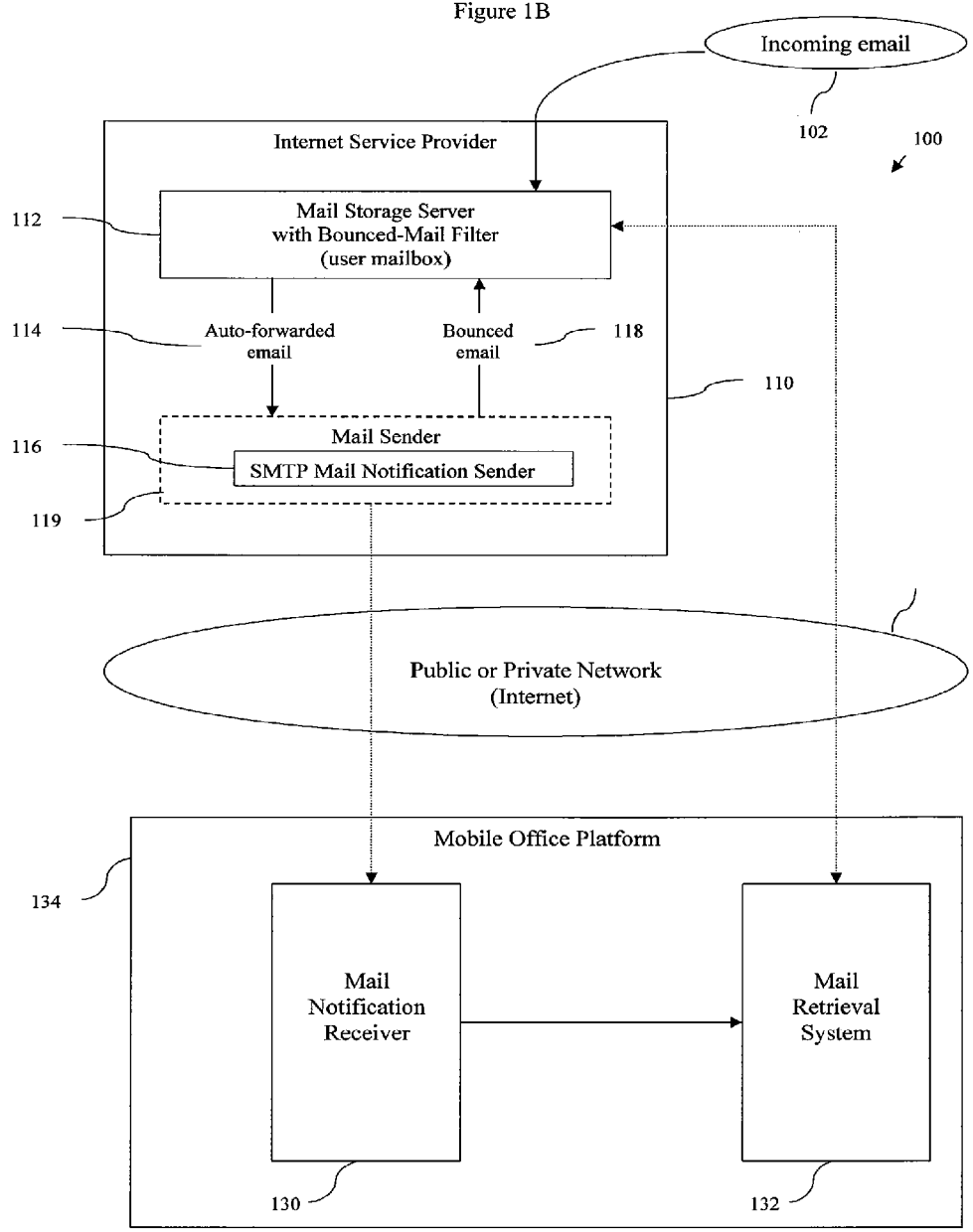

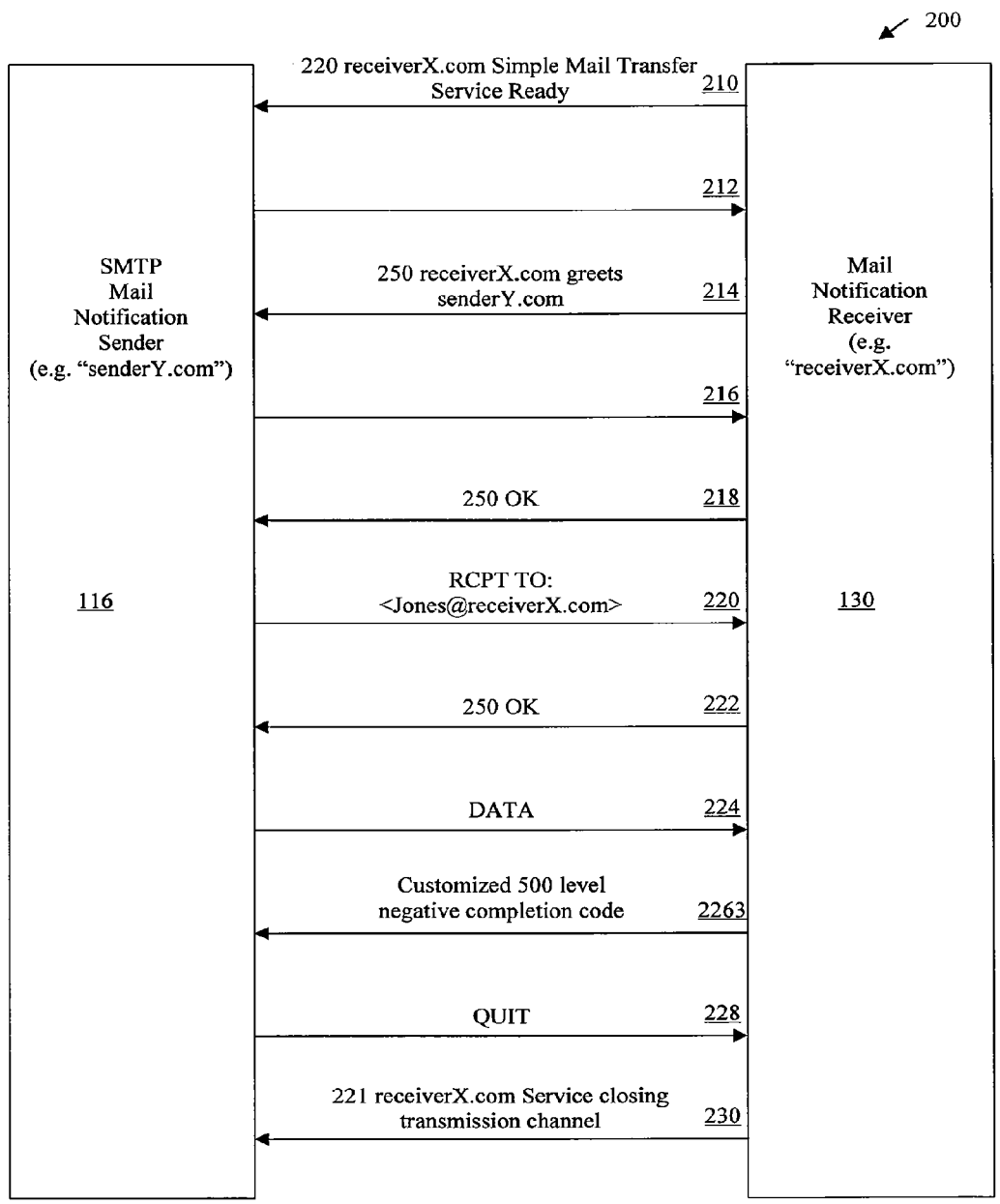

METHOD AND SYSTEM FOR EMAIL NOTIFICATION

CROSS REFERENCE

This application is a continuation of earlier nonprovisional application having application Ser. No. 11/615,091 filed Dec. 22, 2006 now patent Ser. No. 8,028,027, granted on Sep. 27, 2011, and claims priority under 35 U.S.C. 120 thereto. The disclosure of aforementioned application Ser. No. 11/615,091 is hereby incorporated by reference in its entirety.

FIELD

The present application relates to email notification and more particularly a method and system for email notification using auto-forwarding, and a modified mail sender.

BACKGROUND

Electronic data communications, particularly electronic mail (email), is increasingly prevalent for both business and personal uses. Email services may be offered to users by Internet Service Providers (ISPs). Such businesses host a user's email account providing the user with a mailbox and a user interface with which to send and receive email. Many email users desire to have email communication capabilities available to them on a round-the-clock basis and at their finger tips. Users with handheld data communication devices often desire to use their ISP-hosted email services through their handheld devices such as cellular phones, personal data assistants (PDA) and the like having email capabilities to allow the users to have quick access to messages and remain connected to others.

A mail notification receiver alerts a mail retrieval system when new incoming electronic mail arrives in the user's ISP mailbox. Once the mail retrieval system is alerted of the presence of new mail, it will then automatically retrieve the new mail from the user's mailbox and send it off to the user's device where the mail can be read (e.g. handheld or desktop). Many mail retrieval systems are implemented using a polling approach where the mail retrieval system periodically requests new electronic mail from a user's ISP mailbox. This method of mail retrieval has several disadvantages. Under a polling system, the user is only notified that new electronic mail has arrived after the mail retrieval system has made a polling request and not necessarily when the mail in fact arrives in the user's mailbox. Consequently, the receipt of the electronic mail suffers from a time delay by an amount determined by a preset polling interval (the period between requests to see if new mail has arrived in the user's mailbox). Another difficulty is that where the user has several mailboxes, the mail retrieval system must poll each mailbox separately. This too is time consuming and resource intensive, requiring communication between the mail retrieval system and multiple ISP mail storage servers.

An alternative approach involves building and integrating a dedicated notification server into the ISP's current architecture. The notification server may poll more efficiently and at more frequent intervals, detect incoming mail when it reaches the mail storage server and before it reaches a user's mailbox, scan data buffers for new incoming mail, or detect new mail as it is being directed to a user's mailbox. However, implementation of such an alternative approach requires a significant amount of resources that the ISP may be unable or unwilling to pay.

A solution which addresses one or more of these issues is therefore desired.

BRIEF DESCRIPTION OF THE DRAWINGS

In order that the subject matter may be readily understood, embodiments are illustrated by way of examples in the accompanying drawings, in which:

FIG. 1A is a block diagram which illustrates components of an example mail notification system in accordance with one embodiment, implementing auto-forwarding, a modified mail sender, and a bounced-mail filter;

FIG. 1B is a block diagram illustrating a modified mail sender in accordance with an embodiment;

FIG. 2 is a block diagram showing message flow of a SMTP conversation between an example mail notification sender and an example modified mail sender, implementing a negative completion code;

DETAILED DESCRIPTION

Figure 1C:
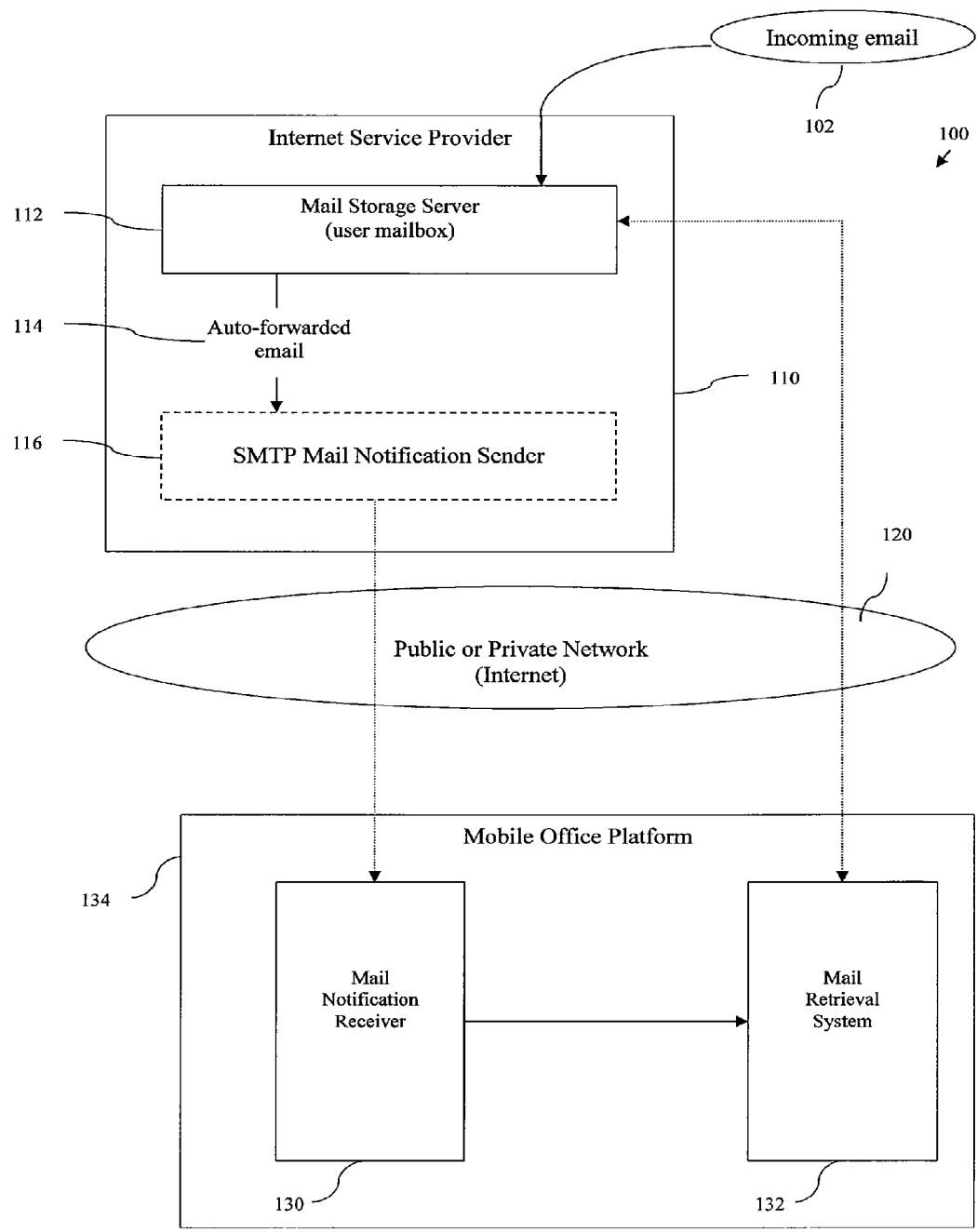
FIG. 1C is a block diagram illustrating a modified mail sender implementing bounced email filtration in accordance with an embodiment.

In one embodiment, there is provided a method of configuring a system for providing notification of a new email received at a user's mailbox stored by a first mail storage system for retrieval by a second mail storage system. The method comprises configuring a mail sender to send a notification email to the second mail storage system, comprising data to notify the second mail storage system of the new email; receive a rejection message from the second mail storage system, and interrupt the sending of further data of the notification email in response to the rejection message. The method may further comprise configuring the mail sender to block bounced email corresponding to the rejection message. The method may yet further comprise configuring the first mail storage system to filter a bounced email prior to entering the user's mailbox, said bounced email received in accordance with the rejection message. In addition, the mail sender may be configured to provide a mail listener module, a mail processing module, and an SMTP client module, said mail listener module to receive the new email from said first mail storage system and to redirect the new email to said mail processing module, said mail processing module configured to define the notification email by removing the new email's body portion and forward the notification email to the SMTP client module, said SMTP client module configured to send said portion of the new email to the second mail storage system.

In an embodiment, the notification email comprises at least a portion of the new email.

In another aspect, there exists a method of providing notification of a new email received at a user's mailbox stored by a first mail storage system for retrieval by a second mail storage system. The method comprises sending a notification email to the second mail storage system, comprising data to notify the second mail storage system of the new email; receiving a rejection message from the second mail storage system; interrupting the sending of further data of the notification email in response to the rejection message; wherein the receipt by the second mail storage system of the notification email triggers the second mail storage system to retrieve the new email from the first mail storage system.

The method may further comprise dropping bounced-mail email corresponding to the rejection message. In an embodiment, the rejection message comprises a 500 level negative completion code.

The method may further comprise transmitting a bounced-mail email to said first mail storage system in response to receiving the pre-determined negative completion code. In one aspect, the first mail storage server may further be configured to filter the bounced-mail email prior to delivery to the user's mailbox. In a further embodiment, the first mail storage server is further configured to filter the bounced-mail email prior to delivery to the user's mailbox. In yet another embodiment, the step of sending comprises selectively forwarding the notification email to said second mail storage system in response to a notification subscription.

In one aspect, there is provided a method of triggering a second mail system to retrieve a new email received at a user's mailbox of a first mail storage system. The method comprises receiving from the first mail storage system a notification email comprising data to notify the second mail storage system of the new email; sending a response message, said response message configured to interrupt the sending of further data of the notification email; and triggering, in response to the notification email, the second mail storage system to retrieve the new email from the first mail storage system. In one embodiment, the method further comprises collecting at least two notification emails, each corresponding to a respective new email for the user; and wherein the step of triggering comprises triggering the SMTP mail notification sender to retrieve each of the new emails from said first mail storage server. In a further embodiment, the response message comprises a pre-determined 500 level negative completion code. In yet another embodiment, the method further comprises redirecting the new email to a user's data communication device.

In accordance with one embodiment, there is provided a system for providing notification of a new email received at a user's mailbox stored by a first mail storage system. The system comprises a server comprising a computer configured with one or more applications to provide a mail sender configured to receive the new email from said first mail storage system, the mail sender comprising: a mail listener module configured to receive the new email; a STMP mail receiver module configured to configured to transmit to a mail notification receiver system, a notification email comprising data to notify the mail notification receiver system of the new email, said SMTP client module further configured to interrupt sending further data of the notification email in response to receiving a rejection message from the mail notification receiver system; and wherein the receipt by the second mail storage system of the notification email triggers the second mail storage system to retrieve the new email from the first mail storage system. In an embodiment, the mail sender is further configured to block the transmission of a bounced-mail email corresponding to the rejection message. In yet another embodiment, the mail sender further comprises a mail processing module configured to define the notification email by removing the new email's body portion.

In one embodiment, the system further comprises a subscription agent module for maintaining subscriptions for mail notification, the system selectively sending said notification email in response to said subscriptions. In another embodiment, the notification email comprises at least a portion of the new email.

FIG. 1A is a block diagram showing components of a non-polling mail notification system 100 in accordance with an embodiment. Briefly, a mail notification sender is employed to receive auto-forwarded email from a user's ISP mail storage server to send an email-based notification for communication to a mail notification receiver.

Persons of ordinary skill in the art will appreciate that teachings herein are applicable to mail storage servers with auto-forwarding capability and though a separate mail notification sender is discussed in the examples, no limitations should be imposed as the functions of the mail notification sender can be incorporated into an existing mail storage server. For example, a mail storage server that can directly send or receive emails can be configured to include the functionality of the SMTP mail notification sender. In this manner, the mail storage server would automatically forward at least a portion of the email received at the user's mailbox to the mail notification receiver.

Referring to FIG. 1A, system 100 comprises ISP-based components 110 coupled for communication to a public or private network such as the Internet 120 for communicating email notifications to coupled mobile office platform components 134. ISP-based components comprise a mail storage server 112 for receiving new user email and storing the new email in user mailboxes and a mail notification sender 116 coupled for data communication to mail storage server 112 to receive auto-forwarded email 114 and communicate at least a portion of the email as described further below. Mobile office platform components comprise a mail notification receiver 130 for receiving said portion of the forwarded email and communicating same to a mail retrieval system 132 to trigger a mail fetch cycle to retrieve mail from a user's mailbox, as described in detail further below.

Mail storage server 112 may comprise commonly available hardware and software such as a network-enabled computer with one or more mail server applications (e.g. Microsoft Exchange, Sendmail, Exim, etc.) installed and configured to handle email communications (e.g. Post Office Protocol 3 (POP3) and Simple Mail Transfer Protocol (SMTP)). In accordance with the present embodiment, mail storage server 112 is configured to automatically forward a copy of the new email received at a user's mailbox to the mail notification sender 116 using an auto-forward feature of the mail storage server software. Also, in accordance with the present embodiment, mail storage server 112 is configured to ignore certain bounced-mail emails using a mail filter feature of the mail storage server software ("bounced-mail filter"). Said bounced-mail emails may be restricted to those bounced-mail emails containing a customized negative completion code and will be described in further detail below.

In addition, it would be understood that although the mail storage server shown in FIGS. 1A and 1B includes a bounced mail filter, the filtering function or blocking of bounced emails having a negative completion code prior to entering the user's mailbox could be implemented in other ways. For instance, the mail storage server may be configured to drop the bounced emails having a negative completion code. Alternatively, SMTP rules or specific application level configuration options may be used to drop the bounced emails having a negative completion code. In another example, as shown in FIG. 1C, the SMTP mail notification sender 116 may be configured to directly block the bounced emails resulting from the mail notification process. In this case, the bounced email would be dropped prior to entering the mail storage server 112. Other ways in which the filtering function may be implemented will occur to those skilled in the art.

For convenience, FIGS. 3-7 are shown with a mail storage server having a bounced mail filter but it will be understood that the filtration of the bounced email may be performed by any of the methods described herein.

Figure 5:
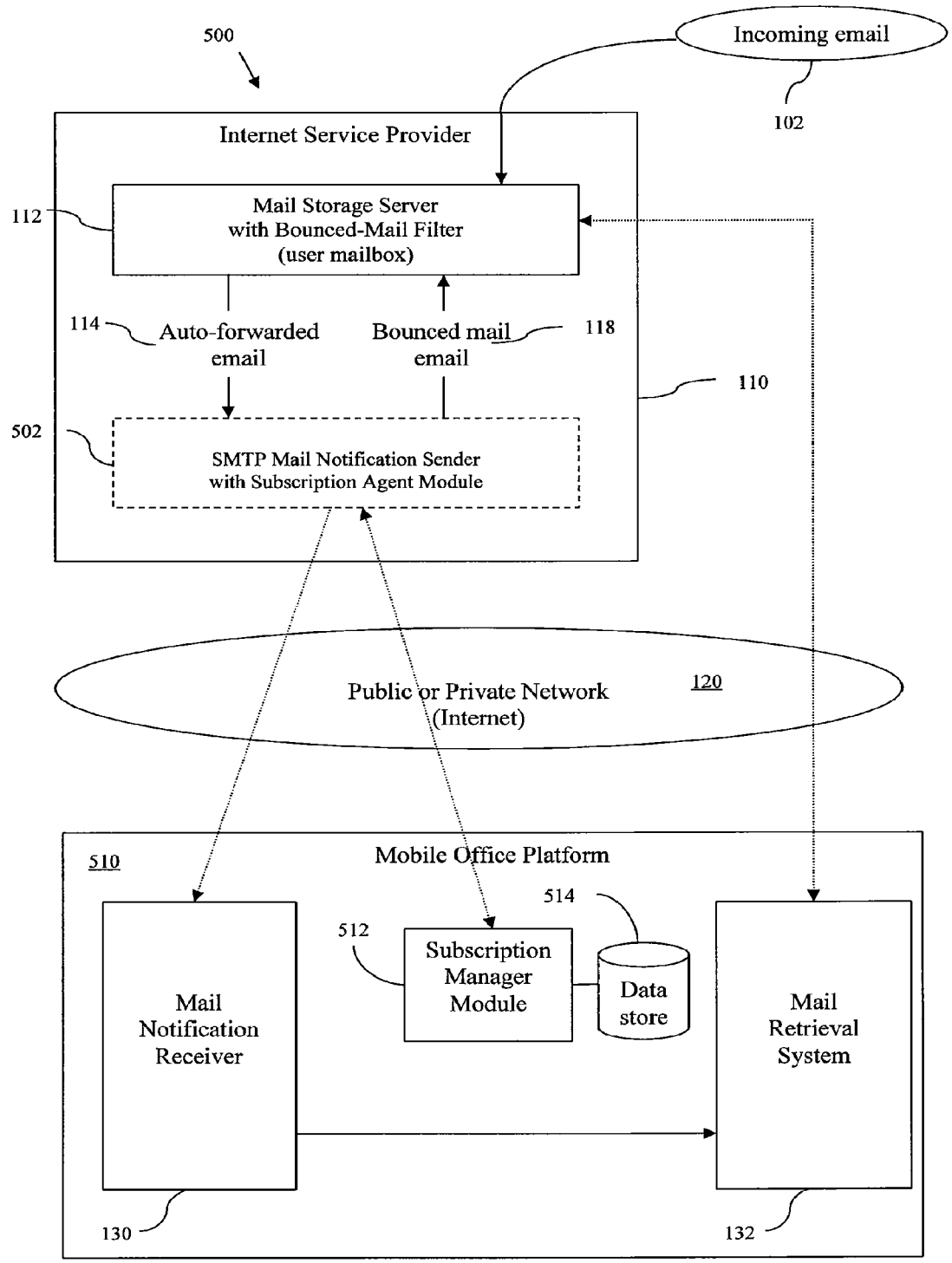
FIG. 5 is a block diagram which illustrates a mail notification system in accordance with another embodiment incorporating a subscription system.
Figure 6:
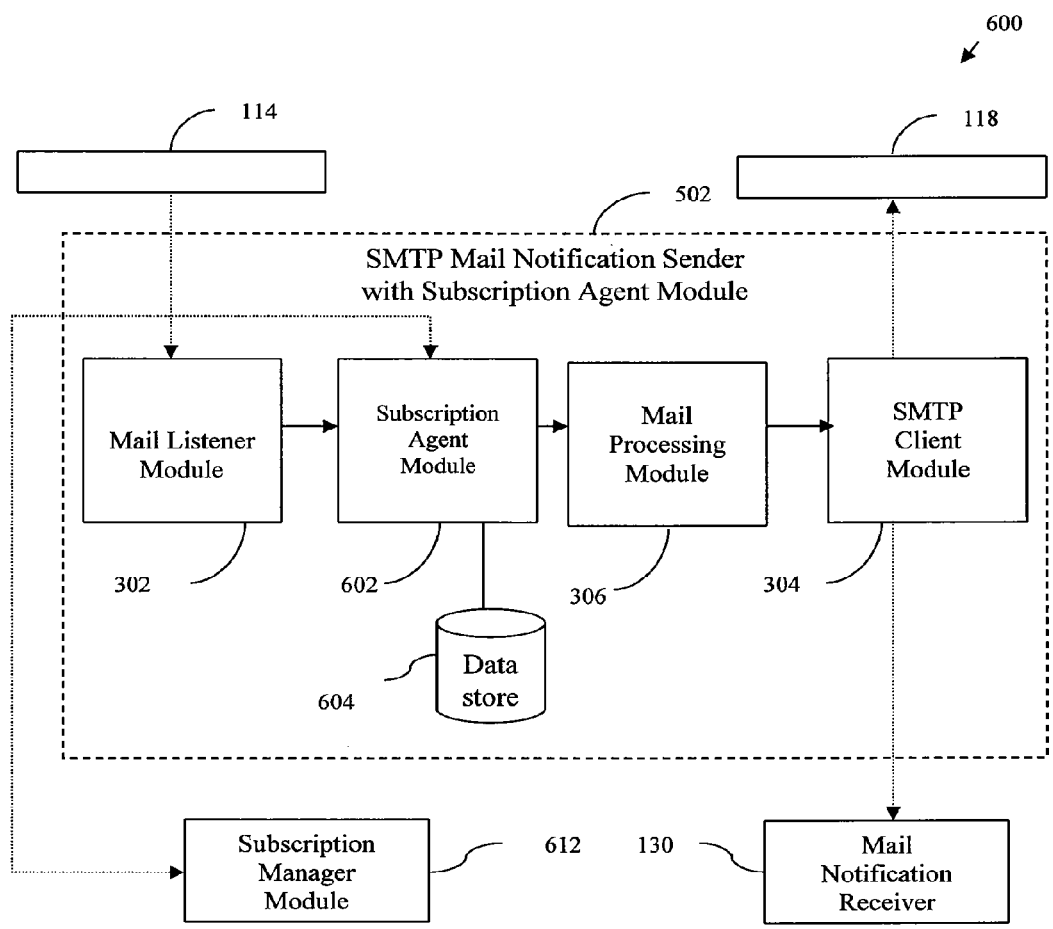
FIG. 6 is a detailed diagram of the mail notification sender of FIG. 5.
Figure 7:
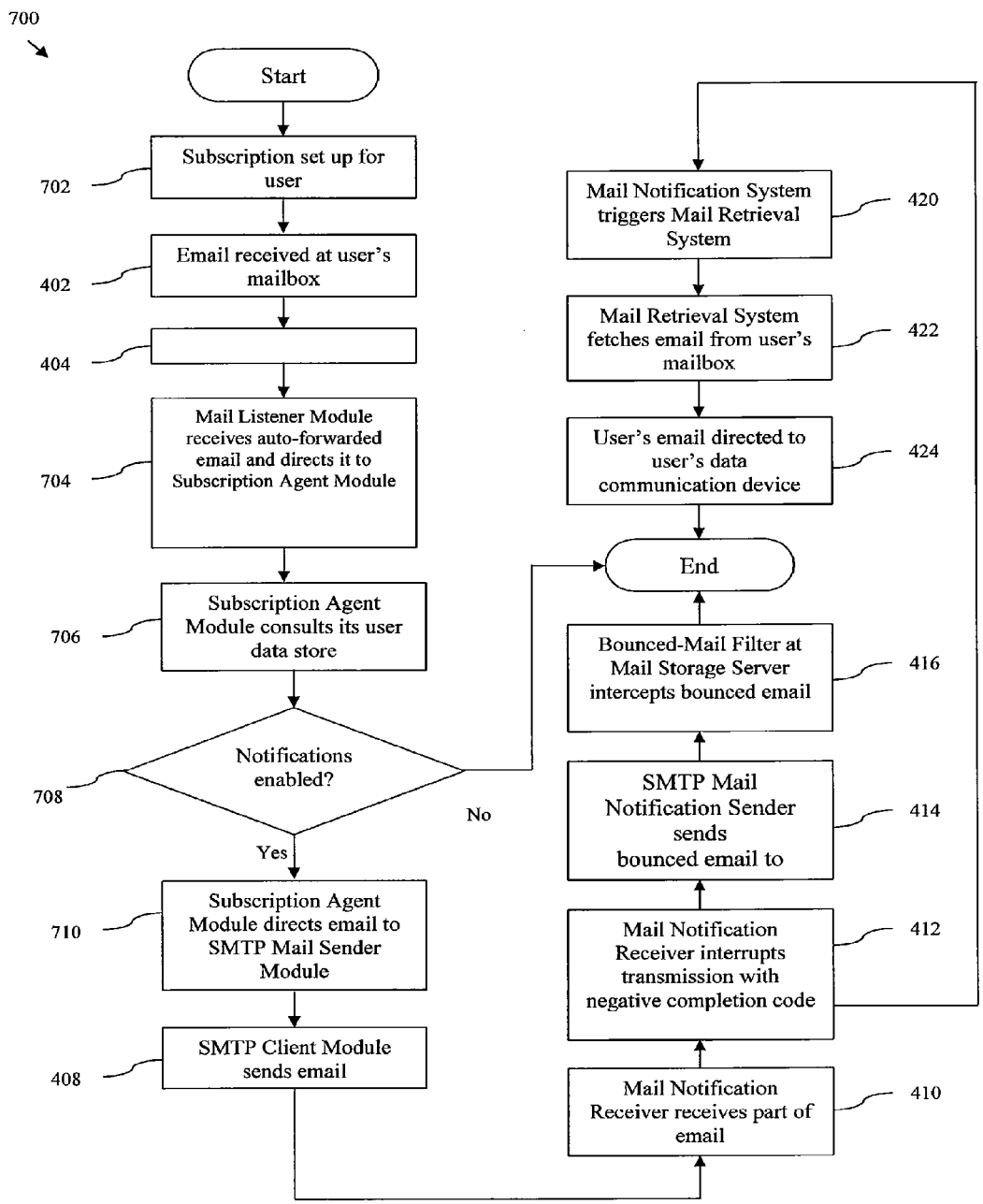
FIG. 7 is a flowchart showing operations for retrieving new email utilizing the non-polling mail notification receiver illustrated in FIG. 5.

Persons of ordinary skill in the art will appreciate that teachings herein are applicable to mail storage servers with auto-forwarding capability and though a mail storage server configured with the auto-forward feature enabled is discussed in the examples, no limitations should be imposed. A subscription system may be used to enable or disable the auto-forward feature in relation to a user's mailbox on the mail storage server. A subscription system is illustrated in FIGS. 5, 6, and 7 and will be described in further detail below.

Mail notification sender 116 may comprise commonly available hardware and software, such as a network-enabled computer with a mail server application (e.g. Microsoft Exchange, Sendmail, Exim, etc.) installed and configured to handle email communications over SMTP, with which to define a server for receiving email 114, for communicating the email to mail notification receiver 130, and for communicating a bounced email message to mail storage server 112. Alternatively, as will be described, it would be understood that the mail notification sender 116 may be implemented on existing hardware provided by the ISP's mail sender system.

Mail notification receiver 130 may comprise commonly available hardware and software, such as a network-enabled computer with a mail server application (e.g. Microsoft Exchange, Sendmail, Exim, etc.) installed and configured to handle email communications over SMTP, with which to define a server for receiving email and for communicating the email to mail retrieval system 132. Additionally, in accordance with the present embodiment, mail notification receiver 130 is configured to interrupt the transmission of forwarded emails from mail notification sender 116 using a modified version of SMTP enabled server software. Said modifications to the software may cause the software to answer the "DATA" command of an SMTP transmission from the mail notification sender with a customized 500 level (i.e. any number from 500 to 599) negative completion code, different from those already recognized under Request for Comments (RFC) 821.

As mentioned earlier, it would be understood by a person of ordinary skill in the art that the mail notification sender 116 may be implemented in a number of different ways. For instance, referring to FIG. 1A, the mail notification sender 116 was shown as a separate entity to send outbound mails using SMTP, for example. Alternatively, referring to FIG. 1B, shown is a mail notification system 100 in accordance with one embodiment. As shown in FIG. 1B, an ISP's existing mail sender 119 is coupled to the mail storage server 112 for receiving the auto-forwarded email 114. In this manner, the ISP's existing mail sender 119 that sends out all outbound emails, is configured to include the functionality of the SMTP mail notification sender 116 thus transmitting at least a portion of the received new email to the mail notification receiver 130. It would be understood that the mail sender 119, may for example, use SMTP. One advantage of this implementation is that by configuring the mail sender 119 to include the SMTP mail notification sender 116, it allows the use of an ISP's existing mail sender without additional hardware thereby improving adaptability into existing ISP environments. As discussed earlier, the mail storage server may also be modified to include the functionality of the mail notification sender 116 directly.

FIG. 2 is a block diagram showing message flow of an example SMTP conversation 200 between SMTP mail notification sender 116 and mail notification receiver 130 in accordance with the present embodiment. The conversation utilizes codes and instructions in accordance with RFC 821, the recognized standard for SMTP. At step 210, mail notification receiver 130 utilizes SMTP code "220" to announce its SMTP service for domain "receiverX.com" as being ready to receive the transmission. At step 212, SMTP mail notification sender 116 utilizes SMTP command "HELO" to identify itself as being the sender SMTP server. At step 214, mail notification receiver 130 acknowledges acceptance of SMTP mail notification sender 116's last command utilizing SMTP code "250" and identifies itself as the receiver SMTP server in the connection greeting reply. At step 216, SMTP mail notification sender 116 utilizes SMTP command "MAIL" to initiate the mail transaction and to provide a reverse source route via which mail notification receiver 130 may return non-delivery notices to the sender. Said source route identifies a host (i.e. mail server) or list of hosts through which the email has already been relayed. At step 218, mail notification receiver 130 utilizes SMTP code "250" to acknowledge acceptance of SMTP mail notification sender 116's requested mail action. At step 220, SMTP mail notification sender 116 utilizes SMTP command "RCPT" to identify an individual recipient of the mail data and to provide a forward source route via which mail notification receiver 130 must relay the email in order for the email to reach its ultimate destination. At step 222, mail notification receiver 130 utilizes SMTP code "250" to acknowledge acceptance of SMTP mail notification sender 116's requested mail action.

At step 224, SMTP mail notification sender 116 utilizes the SMTP command "DATA" to announce its intention to send the data of the email ("mail data") and that all information sent following this command should be treated as mail data until the character sequence "<CRLF>.<CRLF>" is sent, where "<CRLF>" indicates the termination of a character string.

At step 226, mail notification receiver 130 utilizes a customized 500 level SMTP negative completion code to preclude SMTP mail notification sender 116 from sending the mail data. As mentioned above, under standard RFC 281 procedure, once a mail sender transmits the SMTP "DATA" command, the mail receiver must reply with SMTP code "354" in order for mail data to be sent. By sending a 500 level negative completion code in response to SMTP mail notification sender 116's transmission of the SMTP "DATA" command, mail notification receiver 130 is indicating that the "DATA" command was not accepted and the requested action did not occur, and that SMTP mail notification sender 116 should not repeat the request. At step 228, SMTP mail notification sender 116 utilizes SMTP command "QUIT" to request that mail notification receiver 130 close the transmission channel. At step 228, mail notification receiver 130, utilizes SMTP code "221" to acknowledge that it will be closing the transmission channel and then closes the SMTP connection with SMTP mail notification sender 116.

Since only a minimal amount of data is required to notify of the presence of a new message, transferring an entire auto-forwarded email to a remote notification service would be inefficient, use excessive bandwidth, and potentially pose privacy concerns when dealing with third-party providers. For example, if an entire email is forwarded to the mail notification receiver, this may allow a third party to access the email and would compromise security. However, according to an embodiment, once a user receives a portion of the new email as notification of new email received in the user's mailbox, the user would log in to the mobile office platform to access and retrieve said new email. The portion of email forwarded to a mail notification receiver system may include, for instance, the header of the email, address of receiver, the subject line of the email or other portions of email as would be contemplated by a person skilled in the art.

Stopping the transmission of the notification email before the data of the body of the message is sent may mitigate at least some of these concerns.

By employing a distinct 500 level negative completion code (i.e. a 500 level SMTP code not already employed under the RFC 281 standard), the bounced-mail filter at mail storage server 112 can differentiate between a bounced-mail email resulting from the mail notification process and a legitimate bounced-mail email not resulting from the mail notification process. This will save the user from having to read through an unwanted bounced email message for each new legitimate email received. As well, without the bounced-mail filter, an indefinite loop may be created such that each bounced-mail message received at the user's mailbox would trigger the notification process just as any legitimate email would. Such a loop could consume the resources of the ISP, the mobile office platform, and the user's handheld device at an exponential rate and negate any positive effects.

Persons of ordinary skill in the art will appreciate that teachings herein are applicable to all SMTP conversations employing the RFC 281 standard, and though specific basic SMTP commands, codes, and instructions are discussed in the examples, no limitations should be imposed as the SMTP conversation may include additional SMTP commands, codes, and instructions.

Figure 3:
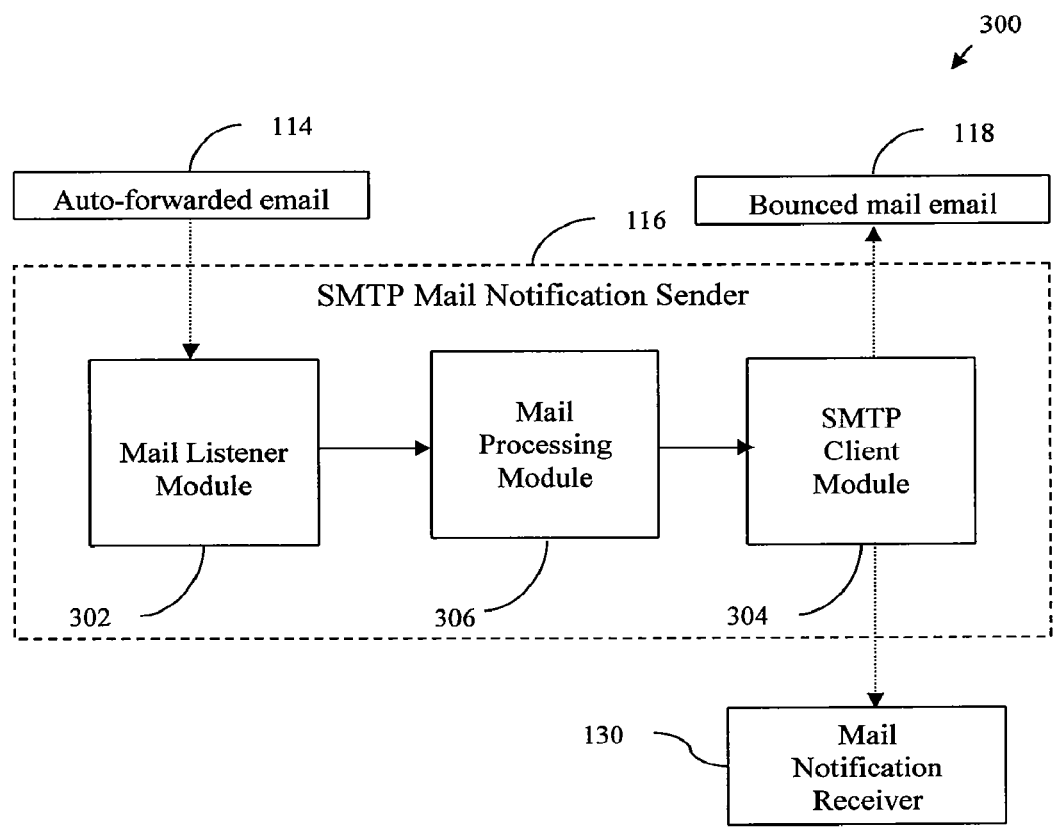
FIG. 3 is a detailed diagram of the mail notification sender of FIG. 1.

FIG. 3 is a block diagram showing further detail of the mail notification sender 116 of FIG. 1. Mail notification sender 116 comprises a mail listener module 302, a mail processing module 306 and an SMTP client module 304.

Mail listener module 302 may comprise commonly available software configured to receive email and to direct said email to the mail processing module 306. The mail processing module 306 is configured to receive said email from the mail listener module 302, and strip away the body portion from said email to provide at least a portion of said email to the SMTP client module 304. The mail processing module 306 can optionally insert new fields or additional headers into said email that include further details about a user's subscription information or the user's mailbox that may be used by the mobile office platform 134.

SMTP client module 304 may comprise commonly available software, such as components of a mail server application (e.g. Microsoft Exchange, Sendmail, Exim, etc.) configured to handle email communications over Simple Mail Transfer Protocol (SMTP), to send forwarded email from mail listener module 302 to a public or private network such as the Internet 120 for communication to a mail notification receiver 130.

Figure 4:
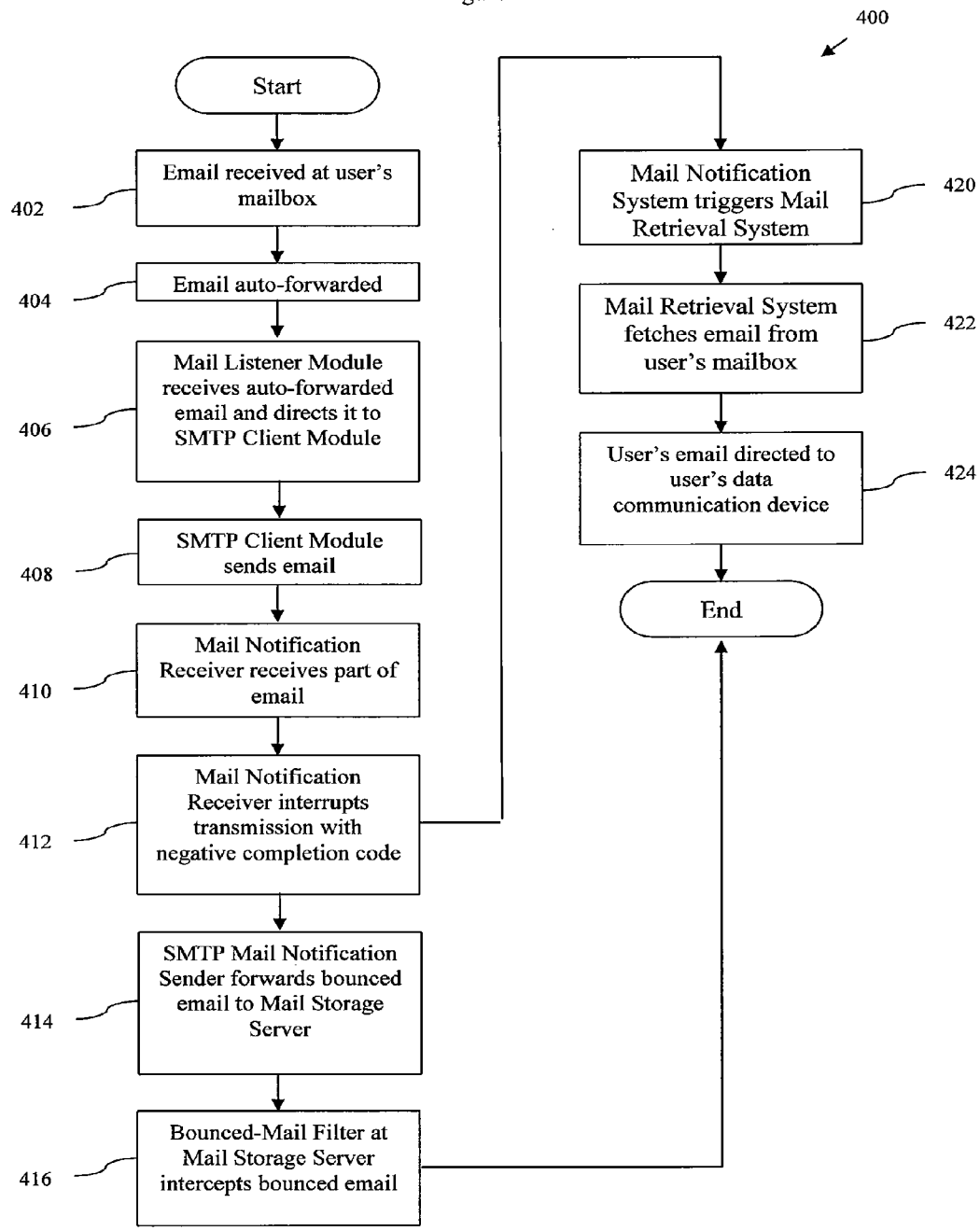
FIG. 4 is a flowchart showing operations for retrieving new email utilizing the non-polling mail notification receiver illustrated in FIG. 1.

FIG. 4 is a flowchart showing operations for retrieving email utilizing a non-polling mail notification system illustrated by mail notification system 100. At step 402, new email is received by the user's ISP and is directed to the user's mailbox on the ISP's mail storage server (e.g. 112). At step 404, a copy of the new email is auto-forwarded (e.g. 114) from the mail storage server to the ISP's mail notification sender (e.g. 116).

At step 406, the mail listener module (e.g. 302) of the mail notification sender receives the auto-forwarded email and directs it to the server's SMTP client module (e.g. 304). At step 408, the SMTP client module transmits the email over the public or private network (e.g. the Internet, 120) to the mail notification receiver (e.g. 130).

The mail notification receiver and the mail retrieval system (e.g. 132) are collectively responsible for retrieving the user's email and sending it to the user's data communication device (e.g. desktop and/or handheld device). At step 410, the mail notification receiver receives a part of the forwarded email from the SMTP client module. At step 412, the mail notification receiver interrupts the transmission of the forwarded email with a negative completion code before the data of the body of the message is communicated. This partly communicated email, lacking the data of the body of the message, represents a notification email. Two simultaneous chains of events follow, one from steps 414 to 416, and the other from steps 420 to 424.

At step 414, the interrupted transmission of the forwarded email triggers the SMTP mail notification sender module to define and communicate a bounced-mail email back to the user mailbox at the mail storage server from which the original email was auto-forwarded. Said bounced-mail email may contain the same negative completion code from step 412. At step 416, said bounced-mail email is intercepted and captured by the bounced-mail filter at mail storage server 112 before the bounced-mail email reaches the user's mailbox.

At step 420, the mail notification system triggers the mail retrieval system, providing it with the necessary information to retrieve new email from the user's mailbox. At step 422, the mail retrieval system initiates a mail fetch cycle, retrieving email from the user's mailbox on the ISP mail storage server. This mail fetch cycle may retrieve email for other users whose mailbox is located on the same ISP mail storage server as the user in question and may also retrieve multiple emails from a user's mailbox, despite the mail notification receiver only receiving a single mail notification email. Also, the mail notification sender or the mail notification receiver may attempt to collapse multiple notifications for a specific user into a single notification so that only one mail fetch cycle is used. At step 424, once the mail is retrieved, it is directed to the user's data communication device. Advantageously, a mail notification sender may be configured using an out-of-the-box solution operable with any mail storage server that provides auto-forwarding capability. A notification mechanism may be implemented into the mail service provider's (e.g. ISP) mail infrastructure utilizing the mail storage server's auto-forwarding functionality to send real time notifications. The mechanism may comprise an out of the box mail solution with minimal script programming to establish a bounced-mail filter at the mail storage server. Accordingly, a mail service provider can leverage existing mail server functionality and invest minimal resources for implementation.

FIG. 5 is a block diagram showing components of a non-polling mail notification system 500 incorporating a subscription system in accordance with an embodiment. Briefly, the subscription system may be in the form of automatic subscriptions used by mobile office platform components 510 to enable or disable notifications of new email received at a user's mailbox.

Persons of ordinary skill in the art will appreciate that teachings herein are applicable to non-polling mail notification systems that have the ability to enable or disable notifications of new mail received at a user's mailbox, and though a subscription system that enables or disables notifications automatically in response to user actions is discussed in the examples, no limitations should be imposed as the subscription system may be in the form of a user interface provided by the user's ISP for the user to manually enable or disable notifications of new email received at a user's mailbox.

While an ISP has mailboxes for many users, mobile office platform components 510 may only need to receive notifications for a subset of those users. The subscription system is responsible for tracking this subset of users. The subscription system comprises a subscription manager module 512 and a subscription agent module 602 (see FIG. 6).

Subscription manager module 512 may comprise a simple data store 514 that keeps track of subscription identifiers. Subscription manager module 512 may be used in conjunction with mail notification receiver 130 and mail retrieval system 132 to enable or disable notifications automatically as necessitated by user actions such as creation or deletion of ISP mailboxes. Subscription manager module 512 monitors user actions and sends subscription messages to subscription agent module 602. Subscription agent module 602 maintains a data store of subscriptions and uses it to decide which incoming emails are automatically passed to mail notification receiver 130.

FIG. 6 is a block diagram showing further detail of mail notification sender 502 of FIG. 5. Mail notification sender 502 comprises mail listener module 302, subscription agent module 602 and data store 604, and SMTP client module 304.

Subscription agent module 602 may use a simple data store 604 that keeps track of the users that are to receive notifications. When new mail notifications are desired for a user, subscription manager module 512 issues a subscription request to subscription agent module 602. Subscription agent module 602 establishes the subscription and stores the subscription details in its data store 604. Subscription agent module 602 may then generate an identifier for the subscription and send it back to subscription manager module 512. Subscription manager module 512 stores the subscription identifier in its own data store 514 to be used to disable notifications when notifications are no longer desired.

It will be understood that while the subscription agent module 602 has been shown as a part of the SMTP mail notification sender 502, the subscription agent module 602 may be implemented in different ways. For example, the mail storage server 112 may be configured to include the functionality and subscription notification information of the subscription agent module 602.

FIG. 7 is a flowchart showing operations for retrieving email utilizing a non-polling mail notification system incorporating a subscription system illustrated by mail notification system 500. The operations are similar to those shown in FIG. 4, except for subscription set up at step 702 and a subscription verification phase starting at step 704. At step 702, the subscription agent module (e.g. 602) receives a subscription message from the subscription manager module (e.g. 512) for a user, establishes a subscription for that user, and provides a result to the subscription manager module. Although the subscription enrolment has been described using a subscription agent module, it will be appreciated by a person skilled in the art that subscription for a user may be set up in a number of ways as understood in the art. At step 704, a forwarded mail is received by the subscription agent module from the mail listener module (e.g. 302). At step 706, the subscription agent module determines if a notification is to be forwarded to the mail notification receiver (e.g. 130) by looking at its data store (e.g. 604) of users to see if the email recipient (i.e. the user) has notifications enabled. As illustrated in step 708, if the user does not have notifications enabled, no notification email will be sent and the process will immediately end. If the user does have notifications enabled, the process will proceed. At step 710, the subscription agent module directs the pre-processed email to the SMTP client module (e.g. 304) for forwarding to the mail notification receiver. The remaining steps of 408 to 416 and 420 to 424 are similar to those illustrated in FIG. 4.

Persons of ordinary skill in the art will appreciate that teachings herein are applicable to mail notification senders that have the ability to communicate with a subscription manager module, and though a separate subscription agent module is discussed in the examples, no limitations should be imposed as the functions of the subscription agent module can be incorporated into the mail processing module. Additionally, the functions of the subscription agent module can be incorporated into the mail storage server to enable or disable auto-forwarding directly at the mail storage server in order to save on bandwidth usage between the mail storage server and the mail notification sender. For instance, when notifications are no longer needed for a particular user, the subscription agent module will disable auto-forwarding at the mail storage server for that user.

Although preferred embodiments have been described herein, it will be understood by those skilled in the art that variations may be made thereto without departing from the spirit or the scope of the appended claims.

What is claimed is:

1. A method of configuring a system for providing notification of a new email received at a user's mailbox stored by a first mail storage system for retrieval by a second mail storage system, the method comprising:
    configuring a mail sender to:
        send a notification email to the second mail storage system, comprising
        data to notify the second mail storage system of the new email;
        receive a rejection message from the second mail storage system; and
        interrupt the sending of further data of the notification email in response to the rejection message;
    wherein the receipt by the second mail storage system of at least a portion of the notification email triggers the second mail storage system to determine whether to retrieve the new email from the first mail storage system.

2. The method according to claim 1 further comprising:
    configuring the mail sender to block bounced-mail email corresponding to the rejection message.

3. The method according to claim 1 further comprising:
    configuring the first mail storage system to filter a bounced email prior to entering the user's mailbox, the bounced email received in accordance with the rejection message.

4. The method according to claim 1 further comprising:
    configuring the mail sender to provide a subscription agent module to maintain notification subscription information for the user's mailbox, wherein, the step of configuring the mail sender to send comprises configuring the mail sender to send in response to the notification subscription information.

5. The method according to claim 1 further comprising:
    configuring the mail sender to provide a mail listener module, a mail processing module, and an SMTP client module, the mail listener module to receive the new email from the first mail storage system and to redirect the new email to the mail processing module, the mail processing module configured to define the notification email by removing the new email's body portion and forward the notification email to the SMTP client module, the SMTP client module configured to send the portion of the new email to the second mail storage system.

6. The method of claim 1, wherein the notification email comprises at least a portion of the new email.

7. The method of claim 1, wherein the notification email comprises the new email such that to send the notification email comprises forwarding the new email.

8. The system of claim 1, wherein the second mail storage server determines to retrieve at least two new emails from the first mail storage server associated with the user's mailbox in dependence upon collecting the notification email for the user.

9. A method of providing notification of a new email received at a user's mailbox stored by a first mail storage system for retrieval by a second mail storage system, the method comprising:
   sending a notification email to the second mail storage system, comprising data to notify the second mail storage system of the new email;
   receiving a rejection message from the second mail storage system;
   interrupting the sending of further data of the notification email in response to the rejection message;
   wherein the receipt by the second mail storage system of at least a portion of the notification email triggers the second mail storage system to determine whether to retrieve the new email from the first mail storage system.

10. The method according to claim 9, further comprising: dropping bounced-mail email corresponding to the rejection message.

11. The method according to claim 9, wherein the rejection message comprises a 500 level negative completion code.

12. The method according to claim 9, wherein the first mail storage server is further configured to filter the bounced-mail email prior to delivery to the user's mailbox.

13. The method according to claim 9, wherein the step of sending comprises:
   selectively forwarding the notification email to the second mail storage system in response to a notification subscription.

14. The method of claim 9, wherein the notification email comprises at least a portion of the new email.

15. The method of claim 9, wherein the notification email comprises the new email such that sending the notification email comprises forwarding the new email.

16. A method of triggering a second mail system to retrieve a new email received at a user's mailbox of a first mail storage system, the method comprising:
   receiving from the first mail storage system a notification email comprising data to notify the second mail storage system of the new email;
   sending a response message, the response message configured to interrupt the sending of further data of the notification email; and
   triggering, in response to at least a portion of the notification email, the second mail storage system to determine whether to retrieve the new email from the first mail storage system.

17. The method according to claim 16, further comprising: collecting at least two notification emails, each corresponding to a respective new email for the user; and wherein the step of triggering comprises triggering the SMTP mail notification sender to retrieve each of the new emails from the first mail storage server.

18. The method according to claim 16, wherein the response message comprises a pre-determined 500 level negative completion code.

19. The method according to claim 16, further comprising: redirecting the new email to a user's data communication device.

20. The method of claim 16, wherein the notification email comprises at least a portion of the new email.

21. The method of claim 16, wherein the notification email comprises the new email such that to interrupt the sending of further data comprises interrupting the forwarding the new email by the first email storage system.

22. A system for providing notification of a new email received at a user's mailbox stored by a first mail storage system, the system comprising:
   a server comprising a computer configured with one or more applications to provide a mail sender configured to receive the new email from the first mail storage system, the mail sender comprising:
      a mail listener module configured to receive the new email;
      a SMTP mail receiver module configured to configured to transmit to a mail notification receiver system, a notification email comprising data to notify the mail notification receiver system of the new email, the SMTP client module further configured to interrupt sending further data of the notification email in response to receiving a rejection message from the mail notification receiver system; and
   wherein the receipt by the second mail storage system of at least a portion of the notification email triggers the second mail storage system to determine whether to retrieve the new email from the first mail storage system.

23. The system according to claim 22 wherein the mail sender is further configured to block the transmission of a bounced-mail email corresponding to the rejection message.

24. The system according to claim 22, wherein the mail sender further comprises:
   a mail processing module configured to define the notification email by removing the new email's body portion.

25. The system according to claim 22, further comprising a subscription agent module for maintaining subscriptions for mail notification, the system selectively sending the notification email in response to the subscriptions.

26. The system of claim 22, wherein the notification email comprises at least a portion of the new email.

27. The system of claim 22, wherein the notification email comprises the new email such that the SMTP mail receiver module is configured to forward the new email.

* * * * *